(12) United States Patent  
Montgomery (10) Patent No.: US 10,784,915 B2  
(45) Date of Patent: Sep. 22, 2020

(54) COMPRESSION SLEEVE CARRYING SYSTEM FOR MOBILE ELECTRONIC DEVICES

(71) Applicant: Brian C. Montgomery, Wildwood, MO (US)

(72) Inventor: Brian C. Montgomery, Wildwood, MO (US)

(*) Notice: Subject to any disclaimer, the term of this patent is extended or adjusted under 35 U.S.C. 154(b) by 0 days.

(21) Appl. No.: 15/930,401

(22) Filed: May 12, 2020

(65) Prior Publication Data

US 2020/0274572 A1 Aug. 27, 2020

Related U.S. Application Data

(63) Continuation-in-part of application No. 16/198,901, filed on Nov. 23, 2018.

(51) Int. Cl.
*H04B 1/3888* (2015.01)
*A41D 27/10* (2006.01)
*A41D 31/18* (2019.01)
*H04M 1/04* (2006.01)

(52) U.S. Cl.
CPC ........... *H04B 1/3888* (2013.01); *A41D 27/10* (2013.01); *A41D 31/18* (2019.02); *H04M 1/04* (2013.01)

(58) Field of Classification Search
CPC .............. A45F 2005/008; A45F 5/00; A45F 2200/0516; H04B 1/3888; H04B 1/385; H04B 2001/3855; H04B 2001/3861; A45C 2011/003; A45C 2011/001; A45C 2011/002; H04M 1/04; A41D 27/205
See application file for complete search history.

(56) References Cited

U.S. PATENT DOCUMENTS

| | | | |
|---|---|---|---|
| 9,963,183 B2* | 5/2018 | Karl | B62J 11/00 |
| 2014/0131402 A1* | 5/2014 | Holmes | A45F 5/00 224/222 |
| 2015/0001290 A1* | 1/2015 | Tovar | H04B 1/385 235/380 |
| 2016/0183667 A1* | 6/2016 | MacColl | A45F 5/00 224/222 |
| 2016/0211875 A1* | 7/2016 | Smith | H04M 1/04 |
| 2016/0242531 A1* | 8/2016 | Zerfus | A45F 5/00 |
| 2020/0000162 A1* | 1/2020 | Spies | A41D 13/08 |

* cited by examiner

*Primary Examiner* — Nam T Huynh
(74) *Attorney, Agent, or Firm* — White-Welker & Welker, LLC (57) ABSTRACT

A compression sleeve carrying system for mobile electronic devices such as cell phones that are between 3.5 inches wide and 6.5 inches long, with or without an additionally attached phone case. The carrying sleeve has a pocket for key, credit card, and money storage. The sleeve employs an elastic system that connects four corner brackets in which each corner of the phone sits in. Elastic weaves through the corner brackets and through the a patch system. The patch system is attached to a stretchable fabric under the brackets and the patch system is sewn into the arm sleeve to prevent sweat from getting to the phone. The phone retention space stretches based off of the size of the phone and the brackets have a 0.5 inch space that fits both cell phones or other cell phone size and devices.

19 Claims, 5 Drawing Sheets

COMPRESSION SLEEVE CARRYING SYSTEM FOR MOBILE ELECTRONIC DEVICES

SEQUENCE LISTING OR PROGRAM

Not Applicable

TECHNICAL FIELD OF THE PRESENT INVENTION

The present invention relates generally to a compression sleeve or jack and to a carrying system for mobile electronic devices such as cell phones. More specifically, the present invention relates to carrying cases for cell phones that are between 3.5 inches wide and 6.5 inches long, with or without an additionally attached phone case.

BACKGROUND OF THE PRESENT INVENTION

Electronic devices such as portable music players, cell phones, and personal digital assistants (PDAs) are used every day by millions of people. Though electronic devices are becoming smaller, carrying these electronic devices may still present a problem. For example, PDAs and hybrid PDA-cell phone devices are typically large and cumbersome to place in a pocket. Similarly, carrying and using a portable music player while exercising can be a challenge.

Existing techniques for carrying these electronic devices involve using: belt clips, necklace cases, and armbands. Belt clips are typically used for larger devices such as PDAs and hybrid PDA-cell phone devices. However, these belt clips can be bulky and cumbersome to use. Necklace cases can be used for smaller electronic devices such as portable music players, but are not practical for larger electronic devices. Armbands are typically used to carry portable music players while exercising. However, existing armbands have a number of disadvantages. More specifically, existing armbands are relatively large, do not let skin breathe through the armband, do not stretch, and become brittle as the armband ages.

Additionally, many prior art devices are based on the assumption that cell phones, other communication devices, and computers will evolve downward in size until they are the size of conventional wrist watches. This assumption may not hold true for many communication devices. The Inventor's research on computer screens demonstrates that increasing the size of a computer screen increases user productivity. Many users may decide that increased display size is more important than ultra-small communication devices.

None of the prior art devices and methods have been found to be completely suitable to meet these needs and are cumbersome. The present invention provides such a method and the overall combination of these features is nowhere disclosed in the prior art, which appears to be representative of the general art in this area, although it is not intended to be an all-inclusive listing of pertinent prior art.

SUMMARY OF THE PRESENT INVENTION

In light of the disadvantages of the prior art, the following summary is provided to facilitate an understanding of some of the innovative features unique to the present invention and is not intended to be a full description. A full appreciation of the various aspects of The present invention can be gained by taking the entire specification, claims, drawings, and abstract as a whole.

In order to solve the above problems, the present invention comprised of a method and apparatus for protecting a cell phone from damage by securing it to the person wearing the arm sleeve, jacket, or other article of clothing while still providing access to all functionality. The present invention has a specially designed patch bracket guide. The patch bracket guide allows the sleeve to activate the stretch properties of the elastic with any phone bigger than 2.5 inches×4 inches and up to 3.5×7 inches. The patch bracket guide allows the stretch against itself designed to move vertically and horizontally through the patch.

The present invention has a pocket for key, credit card, and money storage. The present invention employs an elastic system that connects the four corner brackets in which each corner of the phone sits in. The elastic weaves through the corner brackets and through the patch system. Then the patch system is attached to a LYCRA fabric under the brackets and that is sewn into the arm sleeve to prevent sweat from getting to the phone. The space stretches based off of the size of the phone and the brackets have a 0.5 inch space that fits both cell phones or other cell phone size and devices. The whole thing is held in place based off of the close proximity of the LYCRA to the tight compression or the article of clothing.

Another preferred embodiment is to overcome the shortcomings and disadvantages found in the prior art by providing a universal system to store and use a cell phone ANDROID, IOS, or other device without a person holding it in their hands. Also this shirt, jacket, arm, sleeve, or other article of clothing wears and fits like any other compression shirt or arm sleeve or other article of clothing. It allows a cell phone user to take a self-facing picture and fully access their device.

Due to the open nature of the brackets, no matter the make or model of the phone there will be a place to plug in headphones. Also the close proximity of the phone allows easy BLUETOOTH use. The clothing and or arm sleeve is washable by putting in a bra like washable bag then allowed to air dry. The actual bracket is made of plastic, rubber, or metal. It was designed to allow access to all buttons used on the phone and the middle space fits most of today's phones.

Another objective of the present invention is that this allows the user to mount the device directly to his/her arm. The brackets and arm bands are so designed that the user can use the device display segment and data entry segment while the device is attached to the user's arm.

It is also the object of this invention to specifically, in the case of phone as the handheld device, once the phone is in use the speaker can be used and conversation can continue while the hands are completely free.

It is yet another object of this invention to provide dialing or pushing any relevant buttons to use the device and operate it as desired without holding the device in hand, thus rendering hands free.

This summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent form the following Detailed Description, Figures, and Claims.

BRIEF DESCRIPTION OF THE DRAWINGS

The accompanying drawings, which are incorporated herein a form a part of the specification, illustrate the present invention and, together with the description, further serve to explain the principles of The present invention and to enable a person skilled in the pertinent art to make and use The present invention.

DETAILED DESCRIPTION OF THE PRESENT INVENTION

Figure 1:
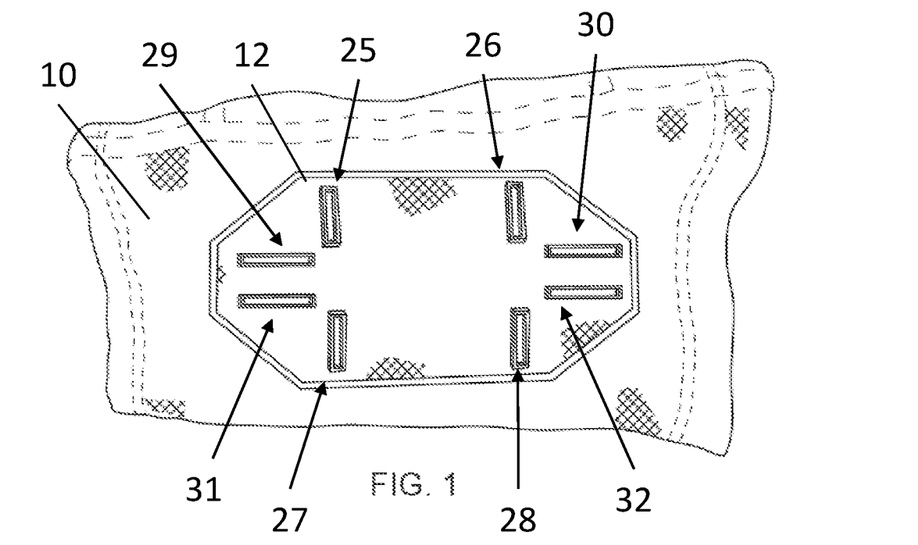
FIG. 1 is an illustration of the patch bracket guide attached to a piece of four way stretch LYCRA illustrating where the four identical brackets are needed to securely attach a phone.
Figure 2:
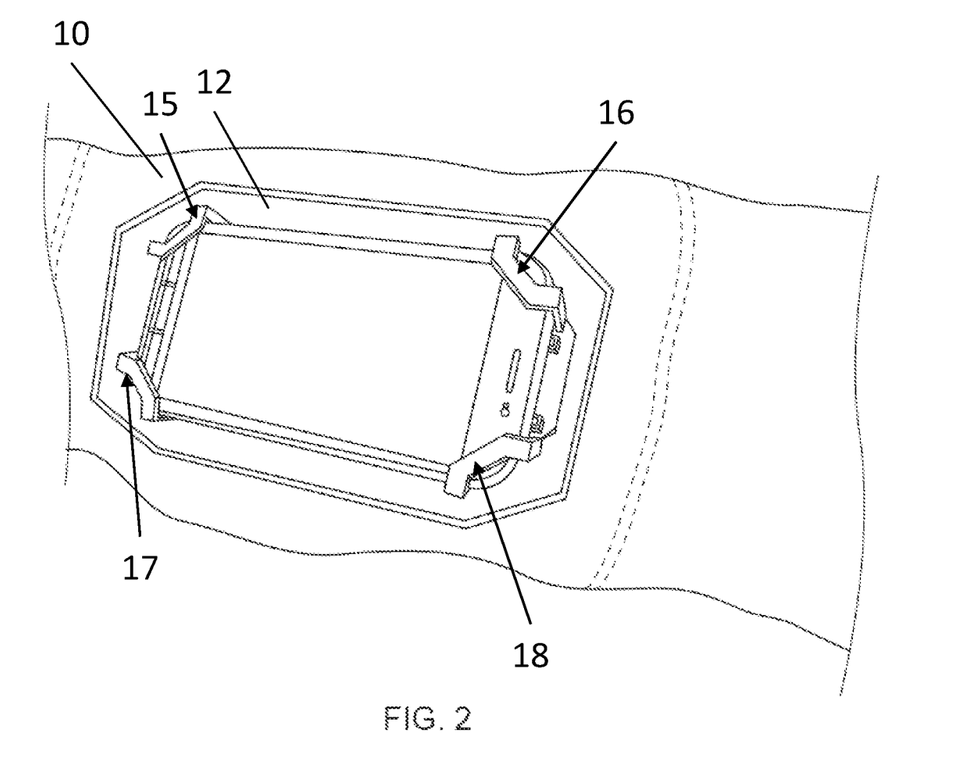
FIG. 2 is an illustration of a phone in the brackets illustrating how the brackets still give full frontal access to the cell phone.
Figure 3:
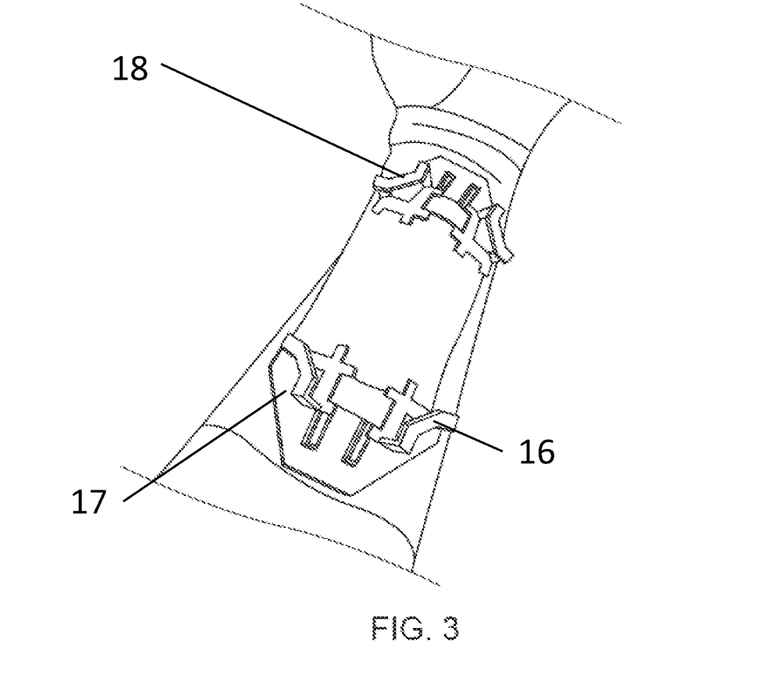
FIG. 3 is an illustration that shows the arm sleeve complete with the brackets attached.
Figure 4:
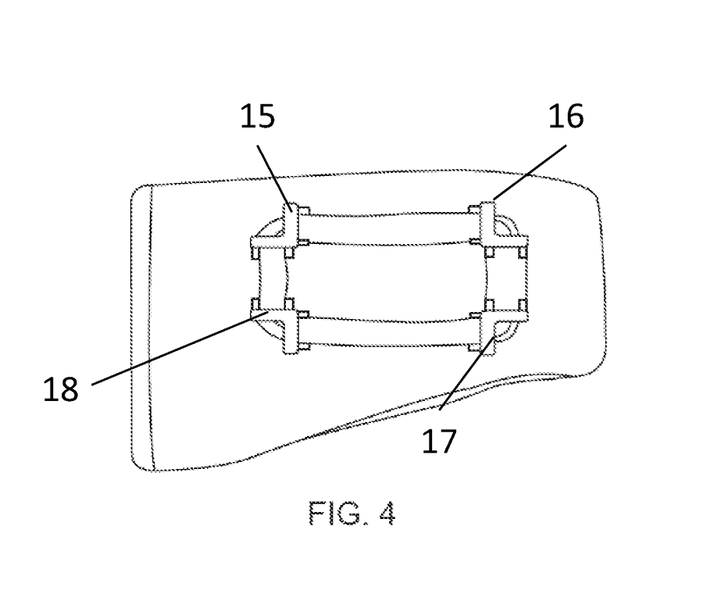
FIG. 4 illustrates an alternative embodiment of the invention where a single piece of stretch fabric runs through and connects the four brackets used to securely retain a phone.
Figure 5:
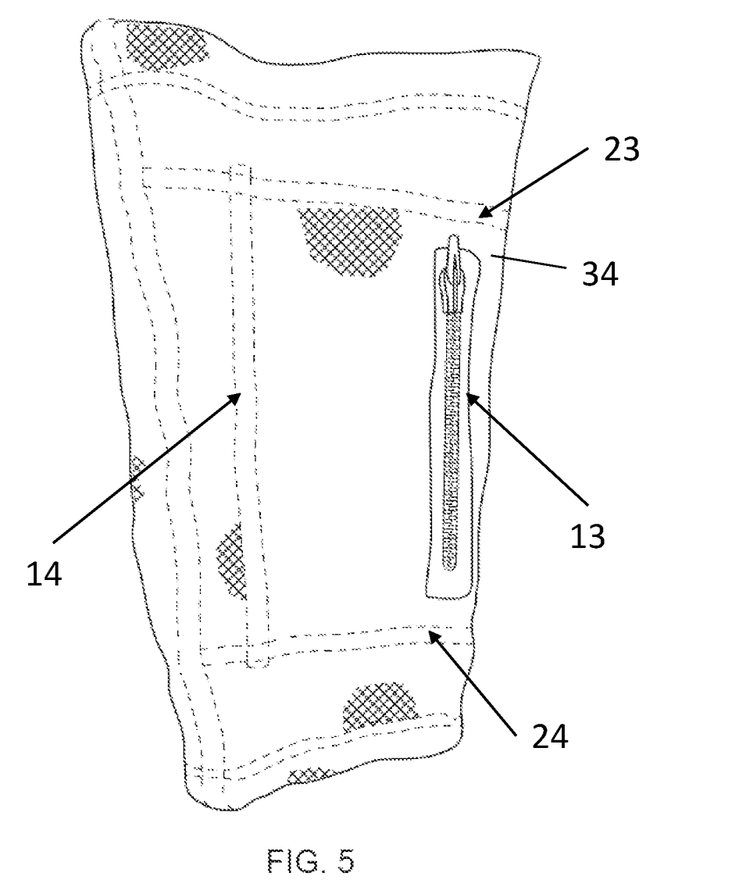
FIG. 5 is an illustration that shows the opposite side of the arm sleeve from that with the attachments, which has a zippered pocket.
Figure 6:
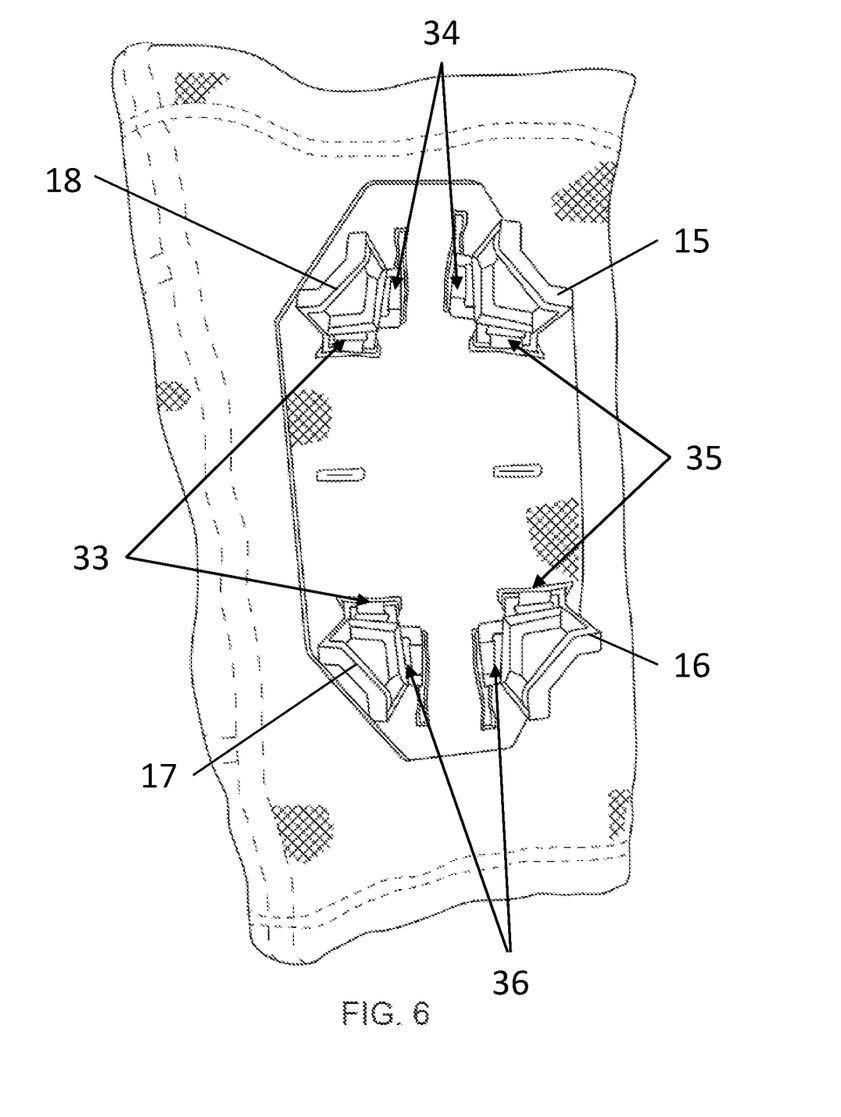
FIG. 6 is an illustration that shows the arm sleeve side with the attachments.
Figure 7:
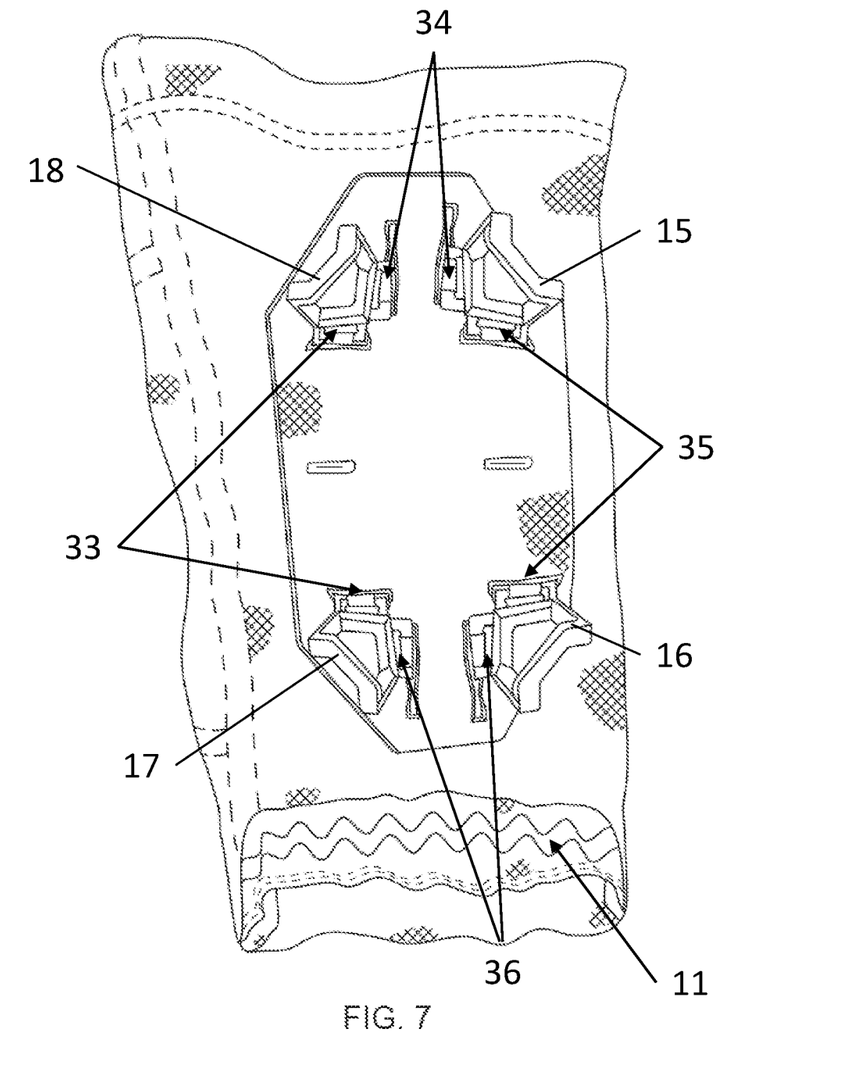
FIG. 7 is an illustration showing the interior surface of the arms sleeve that has an additional silicone layer for preventing sleeve from moving or slipping while on the arm of a wearer.

In the following detailed description of The present invention of exemplary embodiments of The present invention, reference is made to the accompanying drawings (where like numbers represent like elements), which form a part hereof, and in which is shown by way of illustration specific exemplary embodiments in which The present invention may be practiced. These embodiments are described in sufficient detail to enable those skilled in the art to practice The present invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of The present invention. However, it is understood that The present invention may be practiced without these specific details. In other instances, well-known structures and techniques known to one of ordinary skill in the art have not been shown in detail in order not to obscure The present invention. Referring to the figures, it is possible to see the various major elements constituting the apparatus of the present invention.

Now referring to Figures, the present invention is an apparatus or device for protecting a cell phone from damage by securing it to the person wearing the device. The present invention is an arm sleeve, jacket, or other article of clothing that has retention means for securely attaching a mobile device while still providing access to all functionality to the attached or retained mobile electronic device.

A first layer 10 defines the compression sleeve with a silicone elastic strap 11 sewn into the widest opening. The second layer defines the non-stretching movement patch 12 with vertical 25, 26, 27, 28 and horizontal openings 29, 30, 31, 32 with four corner brackets 15, 16, 17, 18 attached to elastic straps 19, 20, 21, 22 that move within the vertical 25, 26, 27, 28 and horizontal openings 29, 30, 31, 32 of the movement patch 12 sewn to a piece of fabric the same type as the fabric used for the compression sleeve. A third layer 34 defines a zipper 13 sewn into the same type fabric used for the compression sleeve and first layer 10 and one vertical stretch stitch 14 and two horizontal stretch stitches 23 and 24 to attach the third layer 34 onto the compression sleeve.

The combination of the compression sleeve first layer 10 and the third layer 34 are sewn together using flatlock stitches to create a zipper pocket for transporting things such as but not limited to credit cards and locker keys.

The movement patch 12 is a non-stretching part of the overall design contained on the first layer 10 in which by having a non-stretching piece sewn onto a piece of material that does stretch the same as the compression sleeve, that allows first layer 10 to stretch the same as and defining the compression sleeve.

Many prior art devices are based on the assumption that cell phones, other communication devices, and computers will evolve downward in size until they are the size of conventional wrist watches. This assumption may not hold true for many communication devices. The Inventor's research on computer screens demonstrates that increasing the size of a computer screen increases user productivity. Many users may decide that increased display size is more important than ultra-small communication devices. None of the prior art devices and methods have been found to be completely suitable to meet these needs and are cumbersome.

In some instances, a carrying case is designed to fit the size of the electronic device plus a protecting case, which means those products must be designed to fit a specific electronic device plus a wide variety of secondary cases and covers. Such devices often use buckles or VELCRO which suggest a one size fits all design, but this is simply not the case when such devices are actually used.

Conversely, the device taught by the present invention provides a phone retention area that stretches to fit multiple length and widths of phone devices with a fixed thickness of half an inch. The device of the present invention is a compression sleeve that has to be sized based on the wearer.

Additionally, pockets are common features in the prior art, but many carrying devices provide a pocket that is underneath the apparatus that holds the electronic device. That is not the same as the present invention. The present invention holds the electronic device on "one side" of the sleeve and the pocket for flat and non-flat objects is on the "second side", so that the pocket and device retaining area are 180 degrees apart, providing direct access to each by a user without one being in the way of the other.

The use of elastic is also known in the prior art, but there are also many shortcomings with using elastic as poor execution can make a device unmanageable or render it usesless to a user for retaining a mobile electronic device or handheld object. The present invention improves on the prior art by teaching a completely different system of a non-stretching movement patch 12 that has elastic straps 33, 34, 35, and 36 weaved through it holding four special designed plastic like corner brackets 15, 16, 17, 18 together and to have all of that sewn onto a stretchable fabric first layer 10 and then have that sewn onto a compression sleeve that stretches.

The present invention eliminates the one size fits all straps and or buckles of the prior art and teaches a new and non-obvious fitted compression sleeve which eliminates the one piece, generic elastomeric supports for retaining a handheld objects proposed by the prior art, to a completely different system teaching the use of a non-stretching movement patch 12 that has elastic straps 33, 34, 35, and 36 weaved through it holding four special designed plastic like corner brackets 15, 16, 17, 18 together and to have all of that sewn onto a stretchable fabric and then have that sewn onto a compression sleeve that stretches.

The present invention eliminates the use of straps, VELCRO, and elastic. The present invention uses the stretch properties of the compression sleeve and the stretch system of the four corner brackets 15, 16, 17, 18. By each corner bracket 15, 16, 17, 18 being connected to each by elastic straps 33, 34, 35, and 36 weaved through them, the more each corner bracket 15, 16, 17, 18 is pulled away from each other, the more the try to come back to each other, making all four corner brackets 15, 16, 17, 18 work as one to hold whatever electronic device that is inserted.

Typically in the prior art, the piece that holds the electronic device is one silicone elastic piece. Each "corner" on that piece moves independently meaning, pulling one corner has no effect on the other three corners, which results in uneven application of retention forces, and difficulty in inserting or removing a device.

The present invention is an arm sleeve 10 that has a specially designed patch bracket guide 11. The patch bracket guide 11 allows the sleeve 10 to activate the stretch properties of the elastic material 12 that make up the arm sleeve 10 with any phone bigger than 2.5 inches×4 inches and up to 3.5×7 inches. The patch bracket guide 11 allows the stretch against itself designed sleeve fabric to move vertically and horizontally through the patch bracket guide 11.

The present invention also has a zippered pocket 13 for key, credit card, and money storage. The present invention employs an elastic system 18 that connects the four corner brackets 14, 15, 16, and 17 in which each corner of the phone sits in and is retained thereby. The elastic weaves through the corner brackets 14, 15, 16, and 17 and through the patch bracket guide 11. Then the patch bracket guide 11 is attached to a LYCRA fabric protective pad or patch 18 under the four corner brackets 14, 15, 16, and 17 and that is sewn into the arm sleeve 10 to prevent sweat from getting to the phone.

The elastic system 18 that connects the four corner brackets 14, 15, 16, and 17 stretches based off of the size of the phone and the four corner brackets 14, 15, 16, and 17 have a 0.5 inch retention space that fits both cell phones or other cell phone size and devices. The four corner brackets 14, 15, 16, and 17 are defined by having a 0.5 inch retention space (height) while being approximately 0.75 inches in width and depth. The 0.5 inch retention space is further defined by a 0.75 by 0.75 bottom surface area with a 0.75 by 0.75 L shaped base and a top surface area with a diagonal top which extends out 0.25 inches from each 0.5 in upright connecting the top and bottom surfaces and then runs 0.34 in on a diagonal to connect the top extensions to create a retention area. The four corner brackets 14, 15, 16, and 17 have an approximate width of 0.1875 in (3/16 in) in width and height. The four corner brackets 14, 15, 16, and 17 are also have slots located on adjacent edges facing the interior of the patch bracket guide 11 and LYCRA fabric protective pad or patch 18 for connecting elastic straps between adjacent corner brackets.

The whole thing is held in place based off of the close proximity of the LYCRA fabric protective pad or patch 18 to the tight compression or the article of clothing, in this embodiment, the the arm sleeve 10.

The device has a low profile and is ergonomically thin to accommodate various handheld devices without being bulky or cumbersome for operation. The device of the present invention facilitates rotation sliding qualities that eliminates any unwanted hand twisting to observe the screen of a retained mobile electronic device and makes it much easier to operate the handheld device with no struggle and minimal effort.

In another embodiment, the present invention teaches a compression sleeve carrying system for mobile electronic devices. The compression sleeve consists of a compression sleeve first layer 10 and a silicone elastic strap 11 second layer sewn into the widest opening of the compression sleeve.

A non-stretching movement patch 12 with vertical 25, 26, 27, 28 and horizontal openings 29, 30, 31, 32 for supporting elastic straps 33, 34, 35, 36 connecting four separate corner brackets 15, 16, 17, 18 made to receive an electronic handheld object. Sewing the non-stretching movement patch 12 to a second layer of fabric same as the compression sleeve and sewing the second layer on to the compression sleeve by using stretch stitches.

A third layer of fabric 34, same as the compression sleeve on the side opposite of the non-stretching movement patch 12, contains a zipper 13 which after one vertical stretch stitch 14 and two horizontal stitches 23 and 24 are applied to the compression sleeve 10 and the third layer 23 a zipper pocket is formed thereon.

The four corner brackets 15, 16, 17, 18 move independently vertically and horizontally in the defined space of the non-stretching movement patch to receive an electronic handheld object. Each corner bracket 15, 16, 17, 18 is connected to its adjacent corner brackets by elastic straps 33, 34, 35, 36 extending from the inner most position of the vertical 25, 26, 27, 28 and horizontal openings 29, 30, 31, 32 within the non-stretching movement patch 12.

Each corner bracket 15, 16, 17, 18 connected in the non-stretching movement patch 12 contains an opening in which the corresponding corner of the handheld electronic object can be put into. Once the handheld electronic object is contained by the four corner brackets 15, 16, 17, 18, the screen on the handheld electronic object is viewable by the wearer of the compression sleeve.

The compression sleeve is an article of clothing from wrist to forearm in length size specific based on the size of the human forearm in which it is worn.

In an alternative embodiment, the compression sleeve is an article of clothing from wrist to bicep in total arm length size specific based on the size of the human arm in which it is worn.

In yet another alternative embodiment, the compression sleeve is the sleeve on a compression shirt from wrist to shoulder in total arm length size specific based on the size of the human arm in which it is worn.

In still another embodiment, by changing the color of material used for the compression sleeve, the non-stretching movement patch 12, the zipper 13 and the thread used for the stretch stitch, the creator will have a different coordinating article of clothing based on the changed colors.

The device taught by the present invention can be made of LYCRA or NEOPRENE.

Thus, it is appreciated that the optimum dimensional relationships for the parts of The present invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of The present invention should be determined by the appended claims and their legal equivalents, rather than by the examples given.

The embodiments of the present invention in which an exclusive property or privilege is claimed are defined as follows:

1. A compression sleeve carrying system for mobile electronic devices consisting of:
   an arm sleeve;
   a stretchable fabric protective pad sewed to one side of the arm sleeve;
   the stretchable fabric protective pad having, two slit pairs at adjacent 90 degree angles from each other totaling 8 slits;
   four corner brackets; each corner bracket located in a rectangular arrangement within the stretchable fabric protective pad sewed to one side of the arm sleeve each corner bracket connected to a directly opposing corner bracket by elastic fabric;
   the slits creating a patch bracket guide which allows the stretch against itself designed sleeve fabric to move vertically and horizontally through the patch bracket guide without effecting the stretchable fabric protective pad and corner brackets.

2. The device of claim 1, wherein
   the stretchable fabric protective pad sewed to one side of the arm sleeve covers 40-50% of the surface area of the arm sleeve.

3. The device of claim 1, wherein
   the patch bracket guide allows the sleeve to activate the stretch properties of the elastic material that make up the arm sleeve with any phone bigger than 2.5 inches×4 inches and up to 3.5×7 inches.

4. The device of claim 1, further consisting of
   a zippered pocket locating 180 degrees from the stretchable fabric protective pad and corner brackets on the external surface of the arm sleeve.

5. The device of claim 1, further consisting of an elastic system that connects the four corner brackets in which each corner of the phone sits in and is retained thereby; the elastic weaves through the corner brackets and through the patch bracket guide between the arm sleeve and stretchable fabric protective pad sewed to one side of the arm sleeve.

6. The device of claim 1, wherein
   the patch bracket guide is attached to a stretchable fabric protective pad or patch under the four corner brackets and that is sewn into the arm.

7. The device of claim 1, wherein
   the elastic system that connects the four corner brackets stretches based off of the size of the phone.

8. The device of claim 7, wherein
   the four corner brackets have a 0.5 inch retention space that fits both cell phones or other cell phone size and devices.

9. The device of claim 8, wherein
   the four corner brackets are defined by having a 0.5 inch retention space (height) while being approximately 0.75 inches in width and depth;
   the 0.5 inch retention space is further defined by a 0.75 by 0.75 bottom surface area with a 0.75 by 0.75 L shaped base and a top surface area with a diagonal top which extends out 0.25 inches from each 0.5 in upright connecting the top and bottom surfaces and then runs 0.34 in on a diagonal to connect the top extensions to create a retention area;
   the four corner brackets have an approximate width of 0.1875 in (3/16 in) in width and height; and
   the four corner brackets have slots located on adjacent edges facing the interior of the patch bracket guide and stretchable fabric protective pad or patch 18 for connecting elastic straps between adjacent corner brackets.

10. The device of claim 9, further consisting of
    the elastic connecting the corner bracket pairs down the long axis of the arm sleeve is sewn and attached to the the stretchable fabric protective pad at the mid-distance between the opposing corner brackets down the long axis of the arm sleeve;
    the sewn portion creates separates the elastic connectivity between the opposing long axis bracket pairs allowing them to stretch independently of each other.

11. A compression sleeve carrying system for mobile electronic devices consisting of:
    a compression sleeve first layer;
    a silicone elastic strap second layer sewn into the widest opening of the compression sleeve;
    a non-stretching movement patch with vertical and horizontal openings for supporting elastic straps connecting four separate corner brackets made to receive an electronic handheld object wherein the non-stretching movement patch is sewn to a second layer of fabric same as the compression sleeve and the second layer is sewn on to the compression sleeve by using stretch stitches;
    a third layer of fabric, same as the compression sleeve on the side opposite of the non-stretching movement patch contains a zipper which after one vertical stretch stitch and two horizontal stitches are applied to the compression sleeve and the third layer a zipper pocket is formed thereon,
    and four of the corner brackets that move independently vertically and horizontally in the defined space of the non-stretching movement patch to receive an electronic handheld object;
    each corner bracket is connected to its adjacent corner brackets by elastic straps extending from the inner most position of the vertical and horizontal openings within the non-stretching movement patch.

12. The device of claim 11, wherein
    the first layer defining the compression sleeve with a silicone elastic strap sewn into the widest opening,
    the second layer defining the non-stretching movement patch with vertical and horizontal openings with four corner brackets attached to elastic straps that move within the vertical and horizontal openings of the movement patch sewn to a piece of fabric the same type as the fabric used for the compression sleeve and
    the third layer defining a zipper sewn into the same type fabric used for the compression sleeve and first layer and one vertical stretch stitch and two horizontal stretch stitches to attach third layer onto the compression sleeve.

13. The device of claim 11, wherein
    the compression sleeve is an article of clothing from wrist to forearm in length size specific based on the size of the human forearm in which it is worn.

14. The device of claim 11, wherein the compression sleeve is an article of clothing from wrist to bicep in total arm length size specific based on the size of the human arm in which it is worn.

15. The device of claim 11, wherein

The compression sleeve is the sleeve on a compression shirt from wrist to shoulder in total arm length size specific based on the size of the human arm in which it is worn.

16. The device of claim 11, wherein each corner bracket connected in the non-stretching movement patch contains an opening in which the corresponding corner of the handheld electronic object can be put into.

17. The device of claim 11, wherein once the handheld electronic object is contained by the four corner brackets, the screen on the handheld electronic object is viewable by the wearer of the compression sleeve.

18. The device of claim 11, wherein the combination of the compression sleeve and the third layer are sewn together using flatlock stitches to create a zipper pocket for transporting things such as but not limited to credit cards and locker keys.

19. The device of claim 11, wherein the movement patch is a non-stretching part of the overall design contained on the first layer in which by having a non-stretching piece sewn onto a piece of material that does stretch the same as the compression sleeve, now that allows first layer to stretch the same as the compression sleeve.

* * * * *